March 19, 1963  F. C. POWERS  3,082,096
METHOD OF PACKAGING AN ANGEL FOOD CAKE
Filed March 3, 1960  2 Sheets-Sheet 1
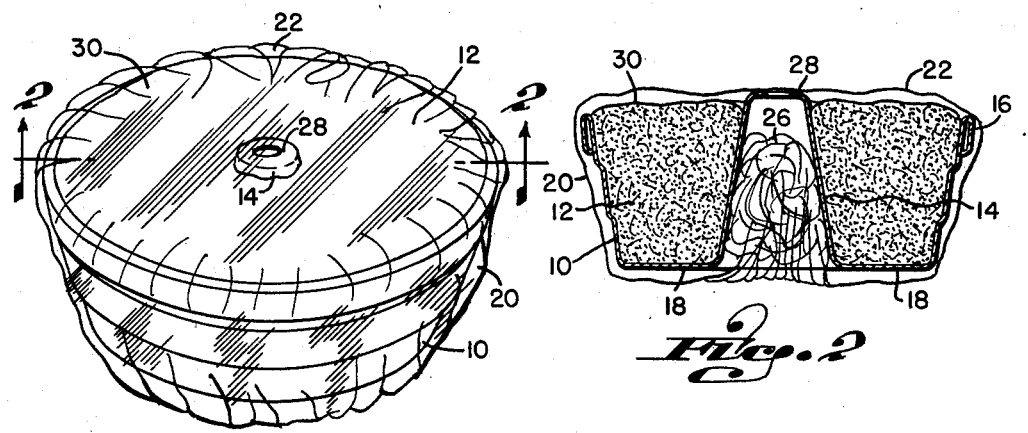
FIG. 1
FIG. 2
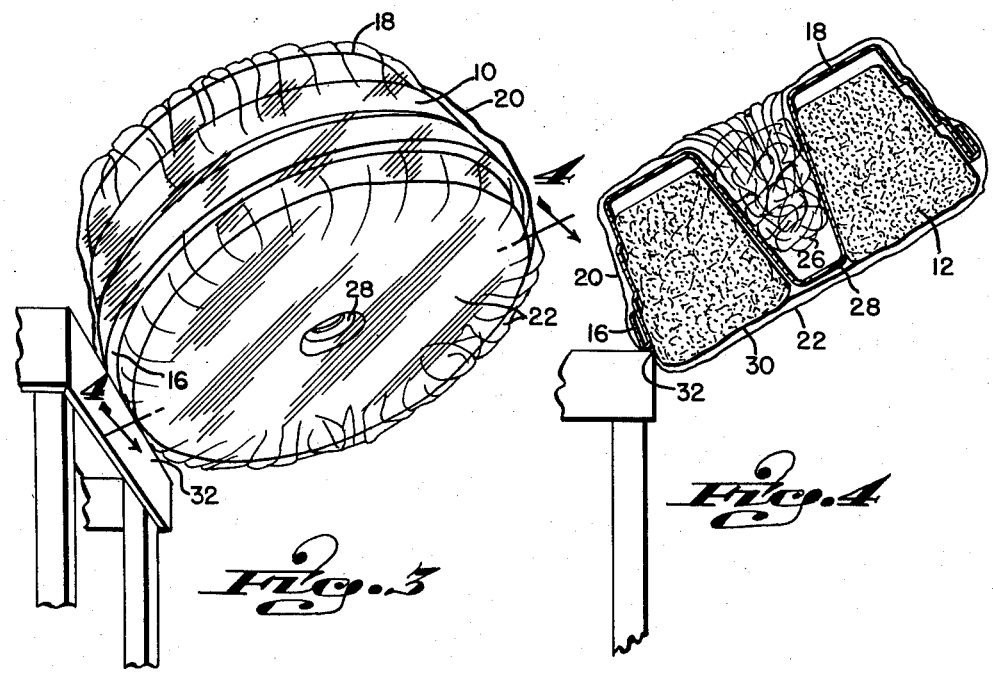
FIG. 3
FIG. 4
INVENTOR.
Frank C. Powers
BY
J. Warren Kinney Jr.
ATTORNEY March 19, 1963    F. C. POWERS    3,082,096
METHOD OF PACKAGING AN ANGEL FOOD CAKE
Filed March 3, 1960    2 Sheets-Sheet 2
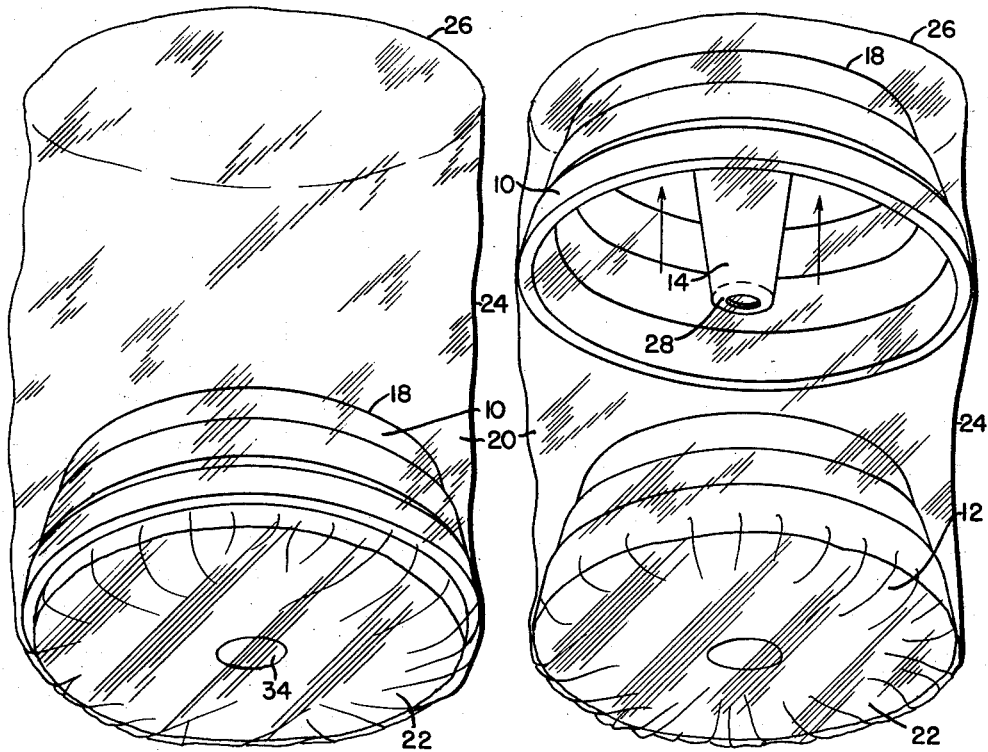
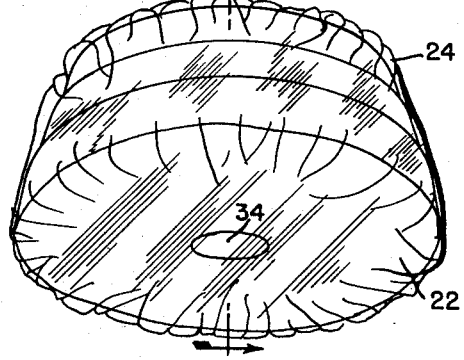
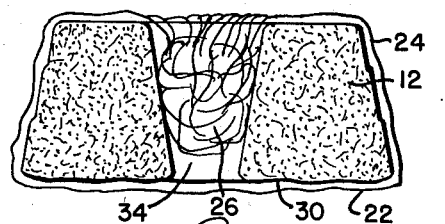
INVENTOR.
Frank C. Powers
BY
J. Warren Kinney Jr.
ATTORNEY

United States Patent Office 3,082,096
Patented Mar. 19, 1963

3,082,096
METHOD OF PACKAGING AN ANGEL FOOD CAKE
Frank C. Powers, 24 Peterson Drive, Storm Lake, Iowa
Filed Mar. 3, 1960, Ser. No. 12,577
1 Claim. (Cl. 99—172)

The present invention relates to a cake package and method of preparing the same.

An object of the invention is to package cakes or kindred baked products in such manner as to preserve their freshness and wholesomeness from the time of production until final retail sale to the consumer, with various advantages of handling resulting.

Another advantage and objective is to expedite and facilitate handling of the baked product by the retailer, with elimination of the crumb and waste problem usually attending transfer of baked goods from an original container to a take-home container.

Another object of the invention is to protect the baked product against physical destruction or mutilation during shipment and handling prior to sale thereof to a consumer, by keeping the product within the pan in which it was baked, until such time as it is delivered to the consumer.

Another object is to effectively display the baked product at all times prior to sale thereof, and to avoid possible contamination thereof by contact with the hands of persons concerned with shipping, handling, and selling of the product.

A further object of the invention is to realize the advantages stated above, while at the same time reducing the cost of handling and selling the merchandise, and conserving the time and effort required to ultimately place the merchandise in the hands of the purchaser.

The foregoing and other objects are attained by the means described herein and illustrated upon the accompanying drawings, in which:

FIG. 1 is a perspective view of a packaged cake, fully baked and housed in the pan in which it was baked, the whole assembly being housed within a transparent envelope in readiness for shipment from the bakery to the retailer.

FIG. 2 is a cross-sectional view taken on line 2—2 of FIG. 1, showing the open end of the envelope stuffed into the center tube of the bake pan to close the envelope on the pan and its contents.

FIG. 3 is a view similar to FIG. 1, showing the wrapped pan and cake inverted, with the cake loosened from the pan by striking the edge of the pan against a stationary ledge.

FIG. 4 is a cross-sectional view taken on line 4—4 of FIG. 3.

FIG. 5 is a perspective view of the cake and pan in inverted position, with the confining envelope released from the pan tube and standing open at the top, so that the retailer may reach in and grasp the inside wall of the pan tube for removal of the pan, leaving the cake confined within the envelope.

FIG. 6 is a view similar to FIG. 5, showing the pan being withdrawn from the envelope.

FIG. 7 is a perspective view of the cake, minus the pan, with the envelope top closed by stuffing it into the center opening of the cake.

FIG. 8 is a cross-sectional view taken on line 8—8 of FIG. 7, and showing the wrapped cake as presented to the purchaser.

In the past, the shipping and handling of baked products such as angel food cakes, have presented various problems which interfered objectionably with the sale of such products. For example, if the cake were removed from the original baking pan at the bakery, and then placed in a cardboard box or other disposable container, handling and shipment to the retailer often resulted in mutilation or damage to the appearance of the cake by the time it reached the consumer. On the other hand, if the cake were delivered to the consumer in the original pan in which it was baked, there was presented the problem of recovering the original bake pan, a relatively expensive item the loss of which could not be tolerated.

In some instances, the cake was shipped to the retailer in the original bake pan, and the retailer at the time of sale was obliged to transfer the cake from the original bake pan to a disposable cardboard box or other container in which the consumer carried the cake from the retailer's premises. This method of selling, although ensuring against the loss of expensive bake pans, was quite objectionable also, due to the fact that the retailer always had crumbs and cake particles to dispose of after transferring the cake from the original pan; and in addition, the cake was generally subjected to contamination by the hands of the retailing clerk, much to the displeasure of the purchaser. This system involved the further objection that the cake was subjected to exposure to air, which caused it to become prematurely dry or stale, resulting in loss of sales and returns of the goods.

The foregoing and other objections attending the selling of baked products have been effectively eliminated by means of the present invention.

With reference to the drawings, FIGS. 1 and 2, the character 10 indicates an angel food pan in which has been fully baked the cake indicated at 12. The pan has the usual center tube 14 which projects above the reinforced rim 16 of the pan. The tube, as usual, is tapered upwardly and inwardly, and stands upon the pan bottom 18. The pan, and the cake within it, are enclosed in an envelope 20 which by preference is a bag having a substantially circular bottom 22 (FIG. 5), a tubular side wall 24, and an open top 26. The envelope may be formed of transparent thin flexible material, such as polyethylene film, cellulose acetate, or similar thin sheeting which is substantially impervious to air and moisture.

In practicing the invention, the cake is baked in the pan with its rim uppermost, and upon completion of the baking period the pan with the cake therein is removed from the oven and placed in inverted condition upon a table or rack to cool. That is, during the cooling period the pan bottom is uppermost, and the small end 28 of the tube rests upon the cooling table or rack. The cake remains immobile within the pan, as it adheres to the pan bottom and sides.

After the cake and the pan have cooled sufficiently, a housing, bag or envelope such as 20 is placed over the inverted cake and pan, and the assembly is inserted until the bag bottom closely overlies the top 30 of the cake. Then the open end 26 of the bag or envelope is tucked underneath the pan bottom and stuffed into the enlarged end of the center tube (FIG. 2) to close the bag or envelope. This completely seals the cake and its original bake pan within the envelope. In this condition the assembly is delivered to the retailer, and as will be understood, the heavy pan protects the adhering cake against damage and distortion while the protective envelope prevents contamination and drying of the contents.

The steps illustrated by FIGS. 3 to 8 are to be performed by the retailer upon completing a sale of the product. As FIGS. 3 and 4 indicate, the retailer or clerk inverts the cake and pan, and by striking the pan rim against a suitable ledge or support 32, loosens the cake from the pan bottom and walls while the transparent envelope remains in place thereabout. If any crumbs or cake particles are formed incident to this operation, they will, of course, remain in the envelope and rest upon the envelope bottom 22.

The next step performed by the clerk is illustrated by FIG. 5, wherein the open top 26 of the envelope is shown withdrawn from the enlarged end of the cake pan tube, so that the clerk may have access to the pan bottom for lifting it from and through the open top of the envelope as depicted by FIG. 6. In so lifting the pan from the envelope, the clerk does not in any sense touch the cake 12, which is resting upon the envelope bottom 22. The hand of the clerk touches only the inside wall of the pan tube, where the envelope previously was tucked in.

Finally, upon complete removal of the pan from the envelope, the open top 26 of the envelope is once more gathered and stuffed into the enlarged end of the central hole 34 of the cake exposed by withdrawal of the cake pan tube. As FIG. 8 shows, the envelope will once again completely enclose the cake, while the wad of material 26 stuffed into the hole 34 maintains the seal. The cake 12, therefore, completely enclosed with its crumbs and any detached particles, and uncontaminated by the hands of the clerk, may be offered to the purchaser either in the FIG. 8 condition or additionally wrapped or boxed, as desired. The retailer retains the original bake pan in every transaction, and eventually returns it to the bakery.

The procedure disclosed herein ensures delivery of baked goods in perfect physical condition, uncontaminated by human hands, and without loss of the original freshness and wholesomeness, so that the consumer is completely satisfied and encouraged to purchase the products so offered. The retailer finds the procedure much to his liking, due to the simplified handling involved and the elimination of crumbs and waste in and about his establishment. The loss of expensive bake pans is completely eliminated, as previously explained.

It is to be understood that various modifications and changes in the details of the product and the procedure may be resorted to, within the scope of the appended claim, without departing from the spirit of the invention, and in this connection it should be noted that those portions 26 of the envelope which are illustrated in FIG. 8 as being stuffed into the bottom of cake opening 34 may be gathered and tied by means of a string, elastic, wire, or other suitable means, instead of being stuffed into said opening.

What is claimed is:

The method of packaging an angel food cake for delivery to the ultimate consumer in the same protective envelope, but removed from the pan in which the cake was baked and delivered to the retailer, which comprises the step of initially housing a fully baked cake within the tubular pan within which it was baked in an elongate, tubular envelope open at one end and having a bottom of its other end which spans the top of the cake and pan with the side walls of the envelope embracing the side walls of the pan and with those portions of the side wall of the envelope adjacent its open end being drawn across the pan bottom and stuffed into the opening therein; which method comprises the steps of loosening and freeing the cake from the pan while the cake and pan are housed within the envelope as aforesaid, to dislodge the cake bodily from the pan onto the bottom of the envelope, withdrawing those portions of the envelope which were stuffed into the opening in the pan bottom for providing access to the interior of said envelope, lifting the bake pan body from the cake upwardly through and out the open end of said envelope, and stuffing into the hole of the cake bottom those portions of the envelope which were withdrawn from the opening in the pan bottom for securing though releasably housing the cake per se within said envelope.

References Cited in the file of this patent
UNITED STATES PATENTS

| | | |
|---|---|---|
| 1,411,223 | Retzbach | Mar. 28, 1922 |
| 1,889,882 | Woods | Dec. 6, 1932 |
| 1,960,962 | Wallach | May 29, 1934 |
| 2,039,374 | Young | May 5, 1936 |
| 2,206,635 | Hays et al. | July 2, 1940 |
| 2,271,921 | Luker | Feb. 3, 1942 |
| 2,489,726 | Salerno | Nov. 29, 1949 |